United States Patent
Hunt et al.

(10) Patent No.: US 11,023,722 B2
(45) Date of Patent: Jun. 1, 2021

(54) DATA CLASSIFICATION BANDWIDTH REDUCTION

(71) Applicant: International Business Machines Corporation, Armonk, NY (US)

(72) Inventors: Hamish C. Hunt, Ashford (GB); Perry A. Harwood, Liskeard (GB); Richard J. Tomsett, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 16/032,529

(22) Filed: Jul. 11, 2018

(65) Prior Publication Data

US 2020/0019773 A1    Jan. 16, 2020

(51) Int. Cl.
*G06F 16/93*    (2019.01)
*G06K 9/00*    (2006.01)
*G06N 3/08*    (2006.01)
*G06K 9/62*    (2006.01)

(52) U.S. Cl.
CPC ..... *G06K 9/00516* (2013.01); *G06K 9/00536* (2013.01); *G06K 9/627* (2013.01); *G06N 3/088* (2013.01)

(58) Field of Classification Search
CPC .................................................. G06F 16/93
USPC ................................. 707/687, 693
See application file for complete search history.

(56) References Cited

U.S. PATENT DOCUMENTS

| | | | |
|---|---|---|---|
| 8,374,974 B2 | 2/2013 | Chen | |
| 10,101,450 B2* | 10/2018 | Asaka | G01S 15/8952 |
| 2005/0254719 A1* | 11/2005 | Sullivan | H04N 19/126 |
| | | | 382/251 |
| 2005/0286758 A1* | 12/2005 | Zitnick, III | G06T 7/55 |
| | | | 382/154 |
| 2010/0063611 A1* | 3/2010 | Patel | G05B 23/024 |
| | | | 700/108 |
| 2011/0229001 A1* | 9/2011 | Kopriva | H01J 49/0036 |
| | | | 382/131 |
| 2011/0246409 A1 | 10/2011 | Mitra | |
| 2012/0113116 A1 | 5/2012 | Luisi | |
| 2013/0188019 A1* | 7/2013 | Christopher | H04N 13/236 |
| | | | 348/46 |
| 2015/0006443 A1* | 1/2015 | Rose | G06K 9/6255 |
| | | | 706/12 |
| 2017/0047071 A1* | 2/2017 | Melkote | G10L 19/0017 |
| 2019/0272835 A1* | 9/2019 | Adami | G10L 19/008 |

OTHER PUBLICATIONS

"Overview of JPEG 2000", JPEG, Last printed Jun. 7, 2018, 2 pages, <https://jpeg.org/jpeg2000/>.

(Continued)

*Primary Examiner* — Baoquoc N To
(74) *Attorney, Agent, or Firm* — Nolan M. Lawrence

(57) ABSTRACT

Concepts for classifying data are presented. Data to be classified is processed in accordance with a data decomposition algorithm so as to generate a plurality of data components, wherein each data component is associated with a respective different value or range of data transience. A subset of the data to be classified based on the plurality of data components. The selected subset of the obtained data is provided to a data classification process for classifying the data.

2 Claims, 4 Drawing Sheets

(56) References Cited

OTHER PUBLICATIONS

"Wavelet", Wikipedia, last edited on May 16, 2018, 16 pages, <https://en.wikipedia.org/wiki/Wavelet>.
Mallat, et al., "A Wavelet Tour of Signal Processing the Sparse Way", Third Edition, Copyright © 2009 by Elsevier Inc., 824 pages.
Montavon, et al., "A Quick Introduction to Deep Taylor Decomposition", last update: Apr. 11, 2017, 5 pages, <http://heatmapping.org/deeptaylor/>.
Montavon, et al., "Deep Taylor Decomposition of Neural Networks", Presented at the ICML 2016 Workshop on Visualization for Deep Learning, 3 pages.

* cited by examiner

DATA CLASSIFICATION BANDWIDTH REDUCTION

BACKGROUND

Data classification aims to identify and classify data into a type (e.g., an image, a document, an audio file, etc.). For such classification processes, it is known to employ machine learning concepts including supervised learning algorithms and neural networks.

Currently, to classify data via such concepts, the entire data (e.g., a whole data file) must be loaded (e.g., into memory from a data storage unit) so as to be input into the classification process. By way of example, for the case of classifying an image, every pixel of an image must be provided to the classification process in order for classification to be performed. Large amounts of data may therefore be required to be transferred and/or loaded to a classification process.

Further, for data classification using a remote Application Programming Interface (API) across a network, the entire data must be communicated across the network, potentially impacting available network speed and/or resources.

SUMMARY

According to an embodiment of the present disclosure there is provided a computer-implemented method for classifying data. The method comprises obtaining data to be classified. The obtained data is processed in accordance with a data decomposition algorithm so as to generate a plurality of data components, wherein each data component is associated with a respective different value or range of data transience. A subset of the obtained data is selected based on the plurality of data components. The selected subset of the obtained data is then provided to a data classification process for classifying the obtained data.

According to another embodiment of the present disclosure, there is provided a computer program product for classifying data. The computer program product comprises a computer readable storage medium having program instructions embodied therewith, the program instructions executable by a processing unit to cause the processing unit to perform a method according to an embodiment of the invention.

According to another aspect of the invention, there is provided a data processing system comprising at least one processor and the computer program product according to an embodiment. The at least one processor is adapted to execute the computer program code of said computer program product.

According to yet another aspect of the invention, there is provided a system for classifying data. The system comprises an input interface adapted to obtain data to be classified. The system also comprises a processing unit adapted to process the obtained data in accordance with a data decomposition algorithm so as to generate a plurality of data components, wherein each data component is associated with a respective different value or range of data transience. The system further comprises a data selection unit adapted to select a subset of the obtained data based on the plurality of data components. The system also comprises an output interface adapted to provide the selected subset of the obtained data to a data classification process for classifying the obtained data.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
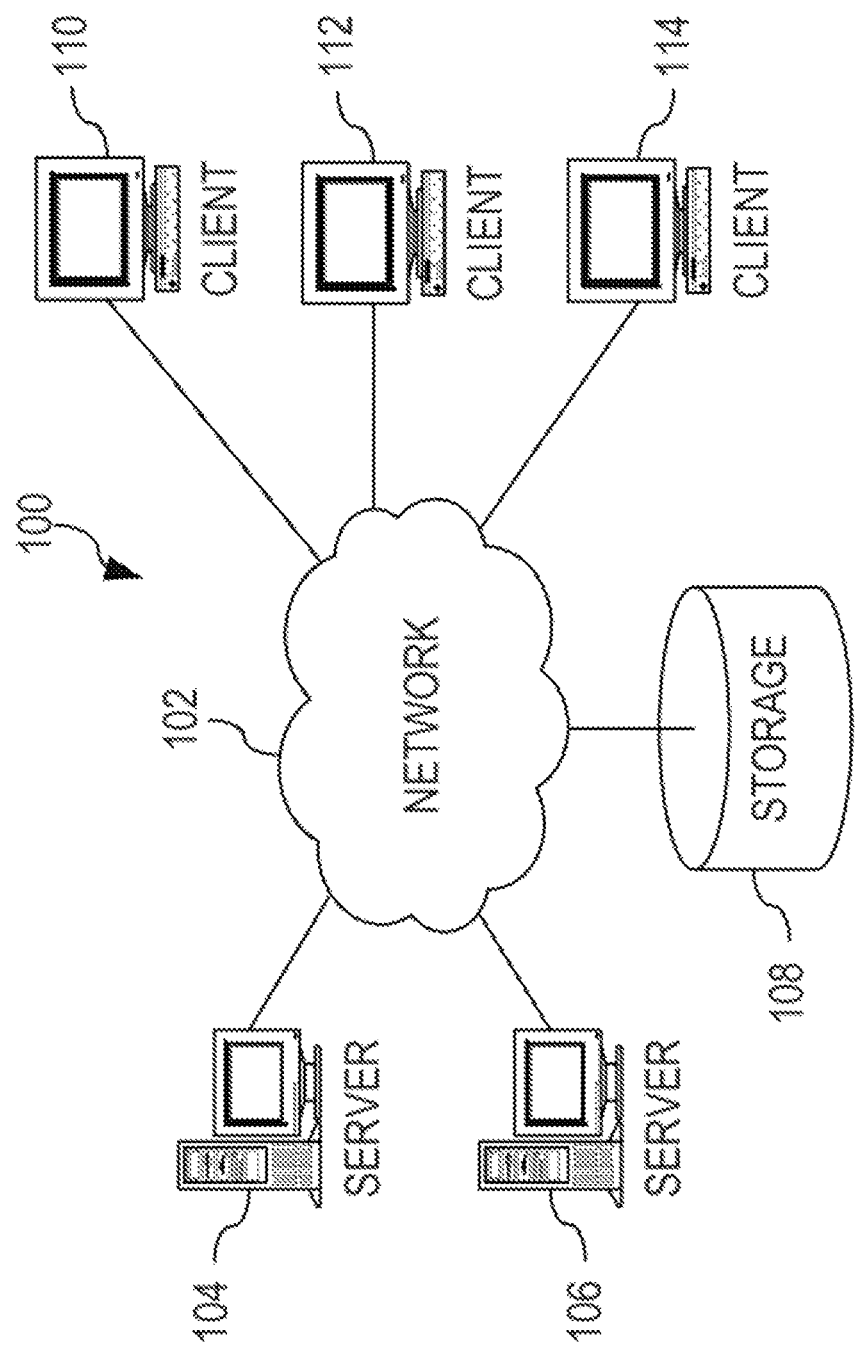
FIG. 1 depicts a pictorial representation of an example distributed system implementing aspects of embodiments of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It should be understood that the Figures are merely schematic and are not drawn to scale. It should also be understood that the same reference numerals are used throughout the Figures to indicate the same or similar parts.

Also, a system may be a single device or a collection of distributed devices that are adapted to execute one or more embodiments of the present disclosure. For instance, a system may be a personal computer (PC), a server or a collection of PCs and/or servers connected via a network such as a local area network, the Internet and so on to cooperatively execute at least one embodiment of the present disclosure.

Proposed are concepts for classifying data. In particular, proposed concepts may reduce or minimize an amount of data transferred for the purpose of classifying data (such as an image, an audio file, etc.). By processing the data with a data decomposition algorithm, the data may be separated into components based on a measure of its transience (e.g., variation with respect to time or space) and the data with the highest value of transience (e.g., the most transient signal component of the data with respect to time or space) may then be selected for provision to a classification process. In this way, only features of the data most relevant to a classification task may be transferred, thus avoiding the transfer of irrelevant (or less relevant) data. A reduction in an amount of data transferred to a classification process (e.g., by only transferring a subset of the data that is deemed relevant to the classification process) may therefore be realized by proposed embodiments. This may increase the speed and/or reduce the cost of a data classification process.

Proposed approaches may overcome shortcomings of conventional approaches by avoiding the need to transfer the whole of a dataset or datafile to a classification process. In other words, rather than transferring an entire file to a classification process, it is proposed to process a file with a decomposition algorithm (such as a wavelet decomposition algorithm) to decompose the file in components having different values of data transience (such as frequency components) and then only select the data having the highest value(s) of transience for provision to a classification process. Such a concept proposes that data having the highest value(s) of transience (e.g., high-frequency components)

relates to the feature(s) most relevant for a classification process and so, by only transferring the data having the highest value(s) of transience, the transfer of irrelevant data (e.g., data having low value(s) of transience) may be avoided.

Accordingly, there may be provided an approach to reduce an amount of data transferred to a classification process by only transferring data having features (e.g., pixels, audio samples, etc.) that are most relevant to the classification process. Features of the data that are considered most relevant may be identified by decomposing the data into components having different values of data transience, wherein the component(s) having the largest value(s) of data transience are taken to be most relevant for classification.

For instance, it is proposed that not every element or piece of data is equally important for the result of a classification process, and that the most relevant elements/pieces of data may be identified based on a measure of data transience (and subsequently prioritized accordingly). For example, high-frequency components of the data (e.g., the most transient signal components) may correspond to features that are relevant for a classification process. Accordingly, by identifying such high-frequency components of the data (e.g., via the application of a discrete wavelet transform process to the data) and only sending these to a classification process, an amount of data transferred to a classification process can be reduced. Similarly, by identifying low-frequency components of the data (e.g., the least transient signal components) and not sending these to a classification process, an amount of data transferred to a classification process can be reduced. Such frequency components may be obtained by processing the data with a wavelet decomposition algorithm for example. Thus, proposed embodiments may employ the application of a discrete wavelet transform to the data so as to decompose the data into its various frequency components.

Concepts for improving data classification through a reduction of required resources and/or an increase in the speed at which classification can be performed may thus be provided. This reduction of the data may reduce input/output bandwidth, memory, processor utilization, or a combination respectively.

Proposed may be a concept for enhanced data classification that can be employed across different types of data sets or files and which may employ data classification techniques. Embodiments may thus provide concepts for data classification which can be used to improve the management and/or storage of data, for example by reducing an amount of data transferred to a classification process.

Embodiments may be employed in conjunction with data classification processes that are undertaken automatically using machine learning concepts. Purely by way of example, an embodiment may be implemented in conjunction with a neural network so as to reduce an amount of data sent to the neural network.

Whereas existing data classification approaches may fall short of requirements, proposed embodiments may be employed to provide data to the data classification approaches in manner which enables them to meet requirements. Proposed embodiments may thus be employed in conjunction with one or more data classification algorithms.

Proposed embodiments may enable data (such as images, audio files, and sensor signals, etc.) to be classified without needing to communicate all of the data (such as an entire image, a full-length audio file, the totality of sensor signals, etc.) to a classification process, thereby reducing an amount of data transferred. By using a measure of data transience to identify and prioritize data relating to features relevant to a classification process, the transfer of irrelevant or low value data may be avoid which helps to reduce communication, processing and/or storage resources.

In some proposed embodiments, processing the obtained data in accordance with a data decomposition algorithm may comprise processing the obtained data in accordance with a wavelet decomposition algorithm to generate a plurality of data components, wherein each data component is associated with a respective different value or range of frequency. Selecting a subset of the obtained data based on the plurality of data components may then comprise selecting a subset of the obtained data based on the respective value or range of frequency associated with each of the plurality of data components. A mathematical technique of Wavelet Decomposition may therefore be employed to analyze the data in order to transform the data into different frequency-limited sub-bands. For instance, a standard Discrete Wavelet Decomposition process, which may also be referred to as a Wavelet Transform, may be employed to decompose the data into frequency-limited sub-bands (e.g., frequency components). Other embodiments may be utilized and other factors may provide for identification of transience. For example, repeated patterns, noise levels, standard deviations, discrete cosine transform, etc.

In some embodiments, selecting a subset of the obtained data based on the plurality of data components may comprise identifying a first data component of the plurality of data components, the first data component being associated with the highest value(s) of data transience. The step of selecting the subset of the obtained data may then be based on the identified first data component. Such an approach may be premised on the proposal that data having the highest value(s) of transience will relate to the feature(s) that is/are the most relevant for a classification process.

Further, selecting the subset of the data based on the identified first data component may comprise: selecting, as the subset of the obtained data, only data of the obtained data that is associated with the identified first data component. By identifying the component associated with the highest value(s) of data transience embodiments can then identify data having the highest value(s) of transience and select only this data for use in the classification process. As part of selecting the subset of data based on the first identified component may further comprise deselection or removal of data that has low values of transience (e.g., cropping one or more portions of an image, deleting or zeroing out of certain signals, silencing certain portions of an audio track and recompiling the audio track utilizing a lossy compression algorithm, etc.). Transfer of irrelevant data (e.g., data having low value(s) of transience) can then be avoided.

In some embodiments, selecting a subset of the obtained data based on the plurality of data components may comprise identifying a second data component of the plurality of data components, the second data component being associated with the lowest value(s) of data transience. The subset of the obtained data may then be selected based on the identified second data component. As above, such an approach may be based on the proposal that data having the highest value(s) of transience will relate to the feature(s) that is/are the most relevant for a classification process, and thus that data having the lowest value(s) of transience (e.g., the lowest frequency component(s)) will relate to the feature(s) that is/are not relevant for a classification process.

Furthermore, selecting the subset of the data based on the identified second data component may comprise selecting, as the subset of the obtained data, only data of the obtained data that is not associated with the identified second data component. By identifying the component associated with the lowest value(s) of data transience, embodiments can then identify data having the low value(s) of transience and not use this data (e.g., deselect this data, or not include it in the subset) for use in the classification process. Transfer of irrelevant data (e.g., data having low value(s) of transience) can then be avoided.

Proposed embodiments may further comprise the step of determining if the data classification process expects data of a predetermined size. Based on the determination result and the size of the selected subset of the obtained data, padding data may then be provided to the data classification process, wherein the padding data comprises data having a predetermined value or pattern. This may account for instance where the classification process expects data of a particular size (e.g., the original size of the obtained data) and/or format. For example, extra data (such as padding data having a null, zero or neutral value) may be provided along with the subset of the obtained data so that the data classification process is provided with data of a predetermined/expected size or format. In this way, proposed embodiments may be adapted to work in conjunction with conventional or legacy classification processes that place predetermined constraint on the size, format and/or structure of input data.

Some embodiments may further comprise processing the plurality of data components with an entropy encoding algorithm to generate a compressed form of the plurality of data components. For example, results from the step of processing the obtained data in accordance with a data decomposition algorithm may be passed through an entropy encoding process (e.g., Huffman encoding, arithmetic encoding, discrete cosine transform spacial compression, etc.) to compress the results and thus reduce data storage requirements.

In an embodiment, the data classification process may employ a neural network and the step of providing the selected subset of the obtained data to the data classification process may then comprise communicating the selected subset of the obtained data to the neural network. Embodiments may therefore be used in combination with classification processes that employ machine learning concepts, such as neural networks, supervised learning networks, artificial intelligence systems, expert systems, and the like.

Also, it is noted that, although embodiments are presented in the context of being applicable in the relation to classification of data files (such as images, document files, audio files, etc.), applicability of the proposed concepts may extend to other fields or types of data where the data has a need to be classified (e.g., into one or more of a plurality of different possible types). For example, embodiments may be implemented in relation to various types of data that may be decomposed using wavelets, such as audio data, image data and sensor signals for example.

Illustrative embodiments may therefore provide concepts for providing data to a classification process, wherein only a subset of the data is provided to the classification process to reduce an amount of transferred data. Efficient data provision concepts for the purpose of data classification may therefore be provided by proposed embodiments.

Modifications and additional steps to a traditional data processing, storage and/or retrieval systems may also be proposed which may enhance the value and utility of the proposed concepts.

As the skilled person will appreciate, data classification may typically involve processing data in accordance with a classification process or algorithm to categorize or classify the data into a class, whose members are similar in some way. A class may therefore be a group of data objects of data files which are similar to each other, and which are dissimilar from data objects/files in other classes. Typically, a class comprises a group of data objects or data files that are associated with the class, and similarity between the data objects/files may be represented by a set of representative values or features of the class. In the case of file type classes for example, the features of the data objects or file may be data parameters, and each parameter may have a set of representative parameter values. As the skilled person will also appreciate, a data object or data file may be classified into more than one class.

Figure 2:
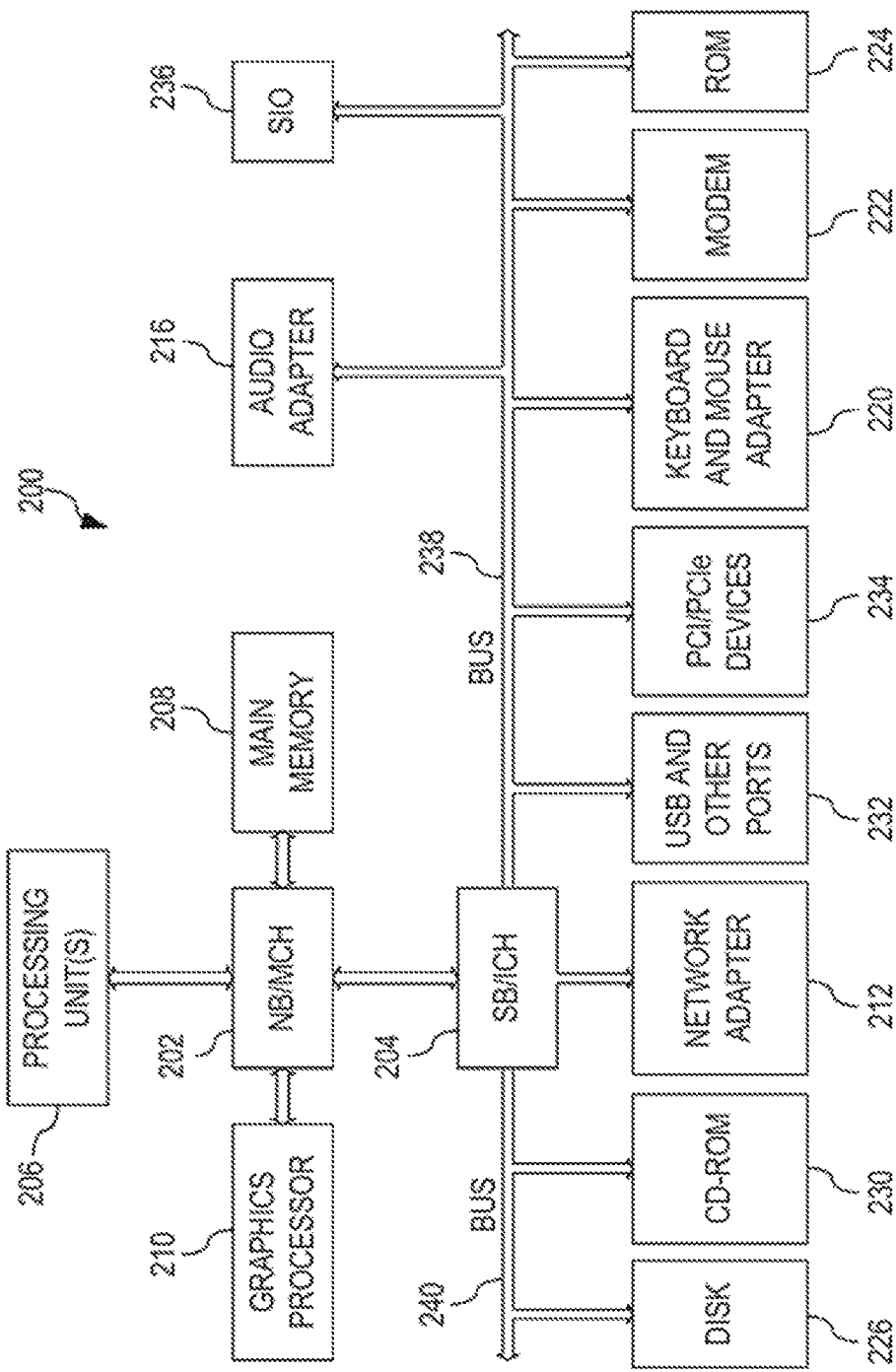
FIG. 2 is a block diagram of an example system in which aspects of the illustrative embodiments may be implemented.

Illustrative embodiments may be utilized in many different types of data processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present disclosure may be implemented. Many modifications to the depicted environments may be made without departing from the scope of the present disclosure.

FIG. 1 depicts a pictorial representation of an example distributed data processing system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present disclosure may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present disclosure may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance a data classification process by reducing an amount of data transferred (e.g., input) to a data classification algorithm. Examples may process the data to identify data having a high and/or low value of a measure of data transience (e.g., a frequency component of the data) and may then select a subset of the data so that the subset does not include data having a low value of transience (for example, by only selecting data having a transience value exceeding a predetermined threshold value). In example implementations, data having a high transience value may be identified by performing a wavelet transform on the data and identifying the high-frequency components of the data. The inventors propose that high-frequency components of the data are typically the most relevant to a classification process, whereas low-frequency components are typically not relevant to a classification process. Further, data that is not selected may be removed (e.g., deleted, zeroed out, cropped, etc.) from the original data before being sent. By identifying the high-frequency components of the data and using such identification to select a subset of the data for provision to a classification, proposed embodiments may reduce an amount of data transferred to a classification process whilst ensuring or maintaining accuracy of the classification process. In this way, an amount of transferred data may be minimized.

Figure 3:
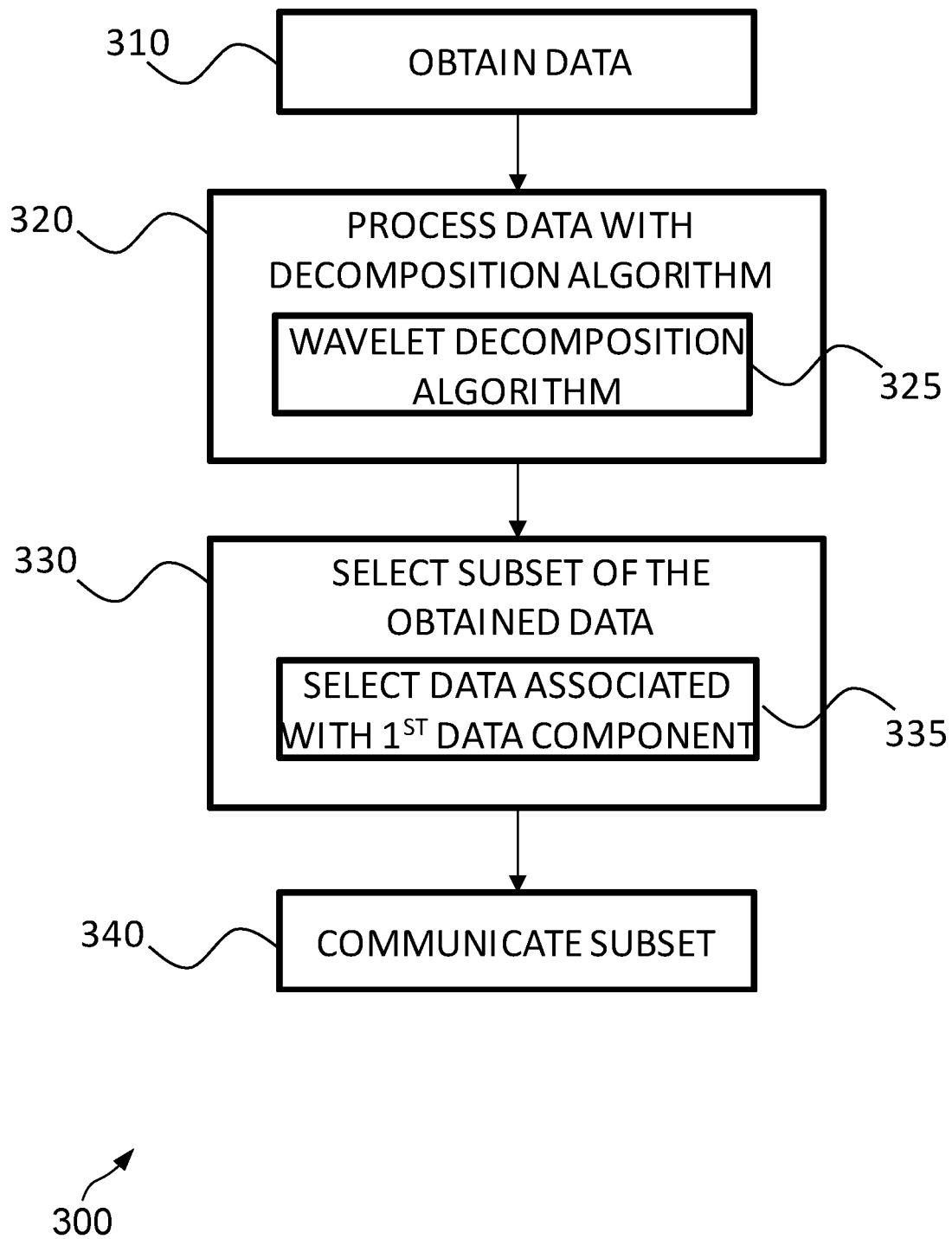
FIG. 3 is a flow diagram of a computer-implemented method for data classification according to an embodiment.

Referring now to FIG. 3, there is depicted a flow diagram of a computer-implemented method 300 according to an embodiment. The method begins with step 310 of obtaining data to be classified. Such data, for example, may comprise a data file.

Next, in step 320, the obtained data is processed in accordance with a data decomposition algorithm to generate a plurality of data components, wherein each data component is associated with a respective different value or range of data transience. More specifically, in this embodiment, step 320 comprises processing 325 the obtained data in accordance with a wavelet decomposition algorithm (e.g., a discrete wavelet transform) to decompose the data into different frequency-limited sub-bands. Completion of step 325 thus decomposes the data file into a frequency components, such a low-frequency components (e.g., data with low transience, approximation, low detail, etc.) and high-frequency components (e.g., data with high transience, accurate, high detail, etc.). While high-frequency components can capture discontinuities, details and varying features in the original data, low-frequency components may characterize the coarse/average structure and/or areas of little to no variation in the original data.

The method then continues with the step 330 of selecting a subset of the obtained data based on the plurality of data components. Here, step 330 comprises selecting 335 a subset of the obtained data based on the respective value or range of frequency associated with each of the plurality of data components. More specifically, in step 335, a first data component associated with the highest value(s) of data transience (e.g., the highest frequency component) of the plurality of data components is identified, and then the subset of the obtained data is selected based on the identified first data component. For instance, only the data that is associated with the identified first data component may be selected for the subset. In this way, only the data associated with the highest frequency component is selected for the subset, and all of the remaining data is not selected for the subset. Put another way, data of low frequency components is not selected and thus disregarded.

Finally, in step 340, the selected subset of the obtained data is provided to a data classification process for the purpose of classifying the obtained data. By way of example, step 340 may comprise communicating the selected subset of data to a neural network which is adapted to implement a data classification process.

It will be understood that the method of FIG. 3 provides a concept for reducing the amount of data transferred to a classification process whilst not adversely affecting the outcome of the classification process. In particular, the concept proposes that the data to be classified can be decomposed into components of differing values of data transience (e.g., frequency components) and then only data of the components with values of data transience exceeding a predetermined threshold (e.g., high-frequency components) may be provided to a classification process on the basis that it is most relevant to the classification task. In this way, the least relevant data (e.g., data of the components with values of data transience not exceeding a predetermined threshold, such as low-frequency components) may not be provided to a classification prices, and the amount of data transferred reduced (in comparison to providing all of the data to the classification process).

The above example of FIG. 3 is presented as a general example. However, it will be understood that proposed embodiments may differ. For example, in another embodiment, the method may further comprise determining if the data classification process expects data of a predetermined size, and based on the determination result and the size of the selected subset of the obtained data, providing padding data to the data classification process, wherein the padding data comprises data having a predetermined value or pattern (e.g., a set of 0's or 1's). Further, some embodiments may be employ a concept of processing the plurality of data components with an entropy encoding algorithm to generate a compressed form of the plurality of data components.

By way of further example, although the above example of FIG. 3 has been described as selecting data associated with the component with highest value(s) of data transience, other embodiments may be adapted to identify a component with the lowest value(s) of data transience. Data may then be selected based on the identified component with the lowest value(s) of data transience. For instance, the process of selecting a subset of the obtained data based on the plurality of data components may comprise: identifying a second data component of the plurality of data components, the second data component being associated with the lowest value(s) of data transience; and selecting the subset of the obtained data based on the identified second data component. Further, selecting the subset of the data based on the identified second data component may comprises: selecting, as the subset of the obtained data, only data of the obtained data that is not associated with the identified second data component.

By way of yet further example, and simply to provide a more detailed understanding of the proposed concepts, step of an embodiment may be summarized as follows.

(i) Perform a Wavelet Decomposition (WD) process on original data;

(ii) Pass the result through an entropy encoder (e.g., Huffman, arithmetic, etc.);

(iii) Store the resulting compressed form of the data in an accessible format to allow the simple selection of the highest frequencies of the WD;

(iv) Select the highest frequencies stored in step (iii). The resulting selection signal may be referred to as "H". H will have significantly lower entropy than the original image or signal and therefore very little data to be loaded to memory from storage and/or transmitted;

(v) Transfer H to where the classification process is to be performed (e.g., to a neural network or machine learning process). If the process is running on the machine where the data is stored, this simply means load H into memory. If the NN is on a remote machine, then transfer H to the remote machine;

(vi) Perform entropy decoding on H;

(vii) Expand H. Set the equivalent other sub-bands (that were not loaded and/or transmitted) to zero. Reconstitute from the WD to get the original size image that the classification process expects. A further saving can be made here if the classification process does not require data to be of a certain fixed size. If this is the case, simply feed in the H signal directly.

(viii) Pass the results of the decoding to the classification process. Features in the data that have been removed in the previous steps can be filled in with zeros (as the classification process may be expecting the same number of features as in the original, uncompressed data. In the case of an image, H will contain a small subset of the total number of pixels in the original image, but the classification process may be expecting an image the same size as the original, so the missing pixels are set to 0—e.g., black).

Accordingly, it will be appreciated that there may be provided a concept for providing data to a classification process, wherein the amount of data provided is minimized.

In some embodiments, there may be provided a system comprising a processing arrangement adapted to carry out any method previously described with reference to FIGS. 1 to 3.

Figure 4:
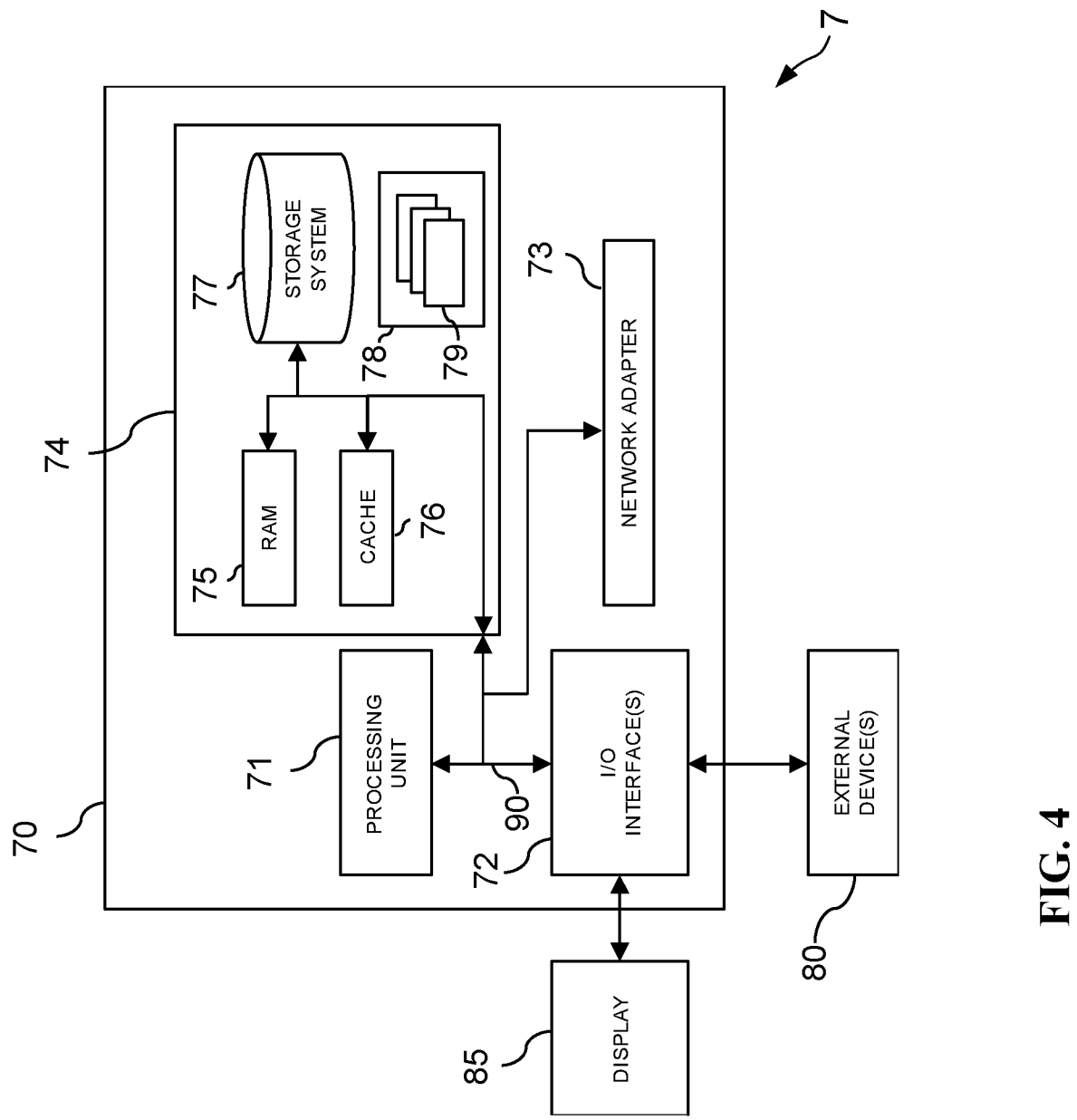
FIG. 4 illustrates a system according to an embodiment.

By way of example, as illustrated in FIG. 4, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present disclosure constitute a method, it should be understood that such a method includes a process for execution by a computer, i.e. is a computer-implementable method. The various steps of the method therefore reflect various parts of a computer program, e.g., various parts of one or more algorithms.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure relates to data classification, and in particular to classification of data using machine learning (such as supervised learning concepts or neural networks).

The present disclosure further relates to a computer program product comprising computer-readable program code that enables a processor of a system to implement such a method.

The present disclosure yet further relates to a system for classifying data. Such a system may, for example, be used on data such as images and audio data and various sensor signals.

The present disclosure provides a method for classifying data. Such a method may provide for the classification of data without needing to load/transfer the entire data to a classification process, and this may then reduce data transfer requirements so as to increase a speed and/or decrease a cost of data classification.

The present disclosure further provides a computer program product including computer program code for implementing the method when executed on a processor of a data processing system.

The present disclosure yet further provides a data processing system adapted to execute this computer program code.

The present disclosure also provides a system for classifying data.

The invention claimed is:

1. A computer program product for classifying data, the computer program product comprising a computer readable storage medium having program instructions embodied therewith, the program instructions executable by a processing unit to cause the processing unit to perform a method comprising:
   obtaining audio data of an audio file to be classified;
   processing the obtained audio data in accordance with a data decomposition algorithm so as to generate a plurality of audio samples of the audio data, wherein audio sample is associated with a respective different value or range of data transience;
   selecting a subset of the obtained audio data based on the plurality of audio samples of the audio data; and
   providing the selected subset of the obtained audio data to a data classification process for classifying the obtained data.

2. A data processing system comprising at least one processor and the computer program product of claim 1, wherein the at least one processor is adapted to execute the computer program code of said computer program product, wherein the classification process is configured to classify the entire audio file without receiving the entire audio file.

* * * * *